W. RICHMOND.
ELECTRIC HEATING RECEPTACLE.
APPLICATION FILED FEB. 13, 1909.
972,248.
Patented Oct. 11, 1910.
2 SHEETS—SHEET 1.
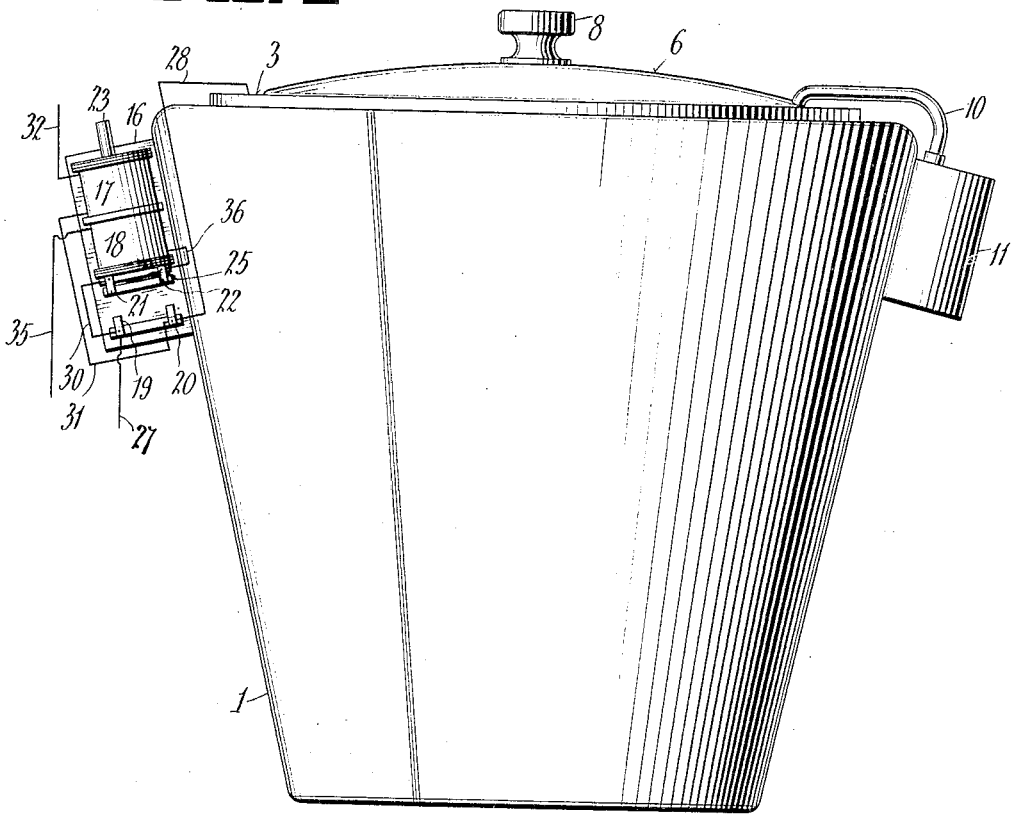
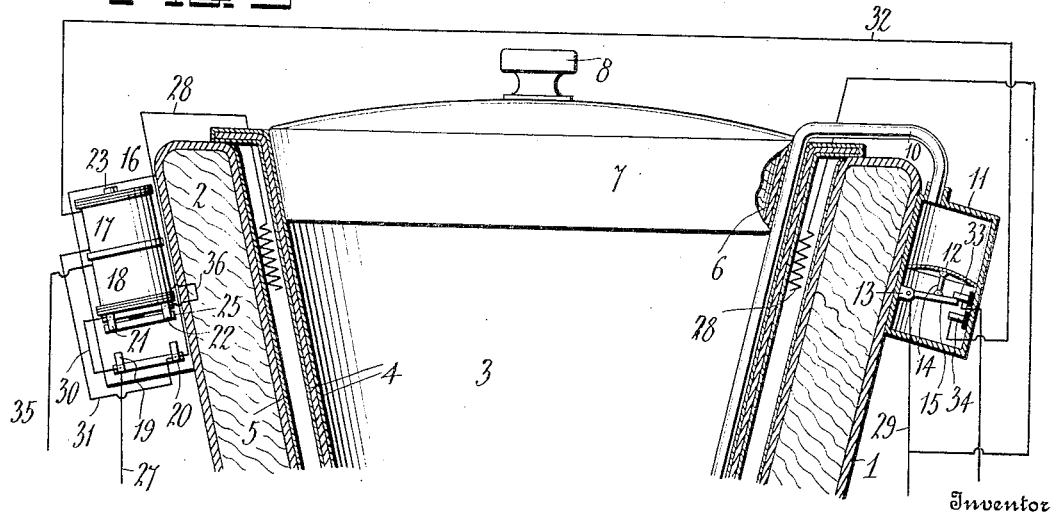
Witnesses
Inventor
Walter Richmond
By
Attorneys W. RICHMOND.
ELECTRIC HEATING RECEPTACLE.
APPLICATION FILED FEB. 13, 1909.
972,248.
Patented Oct. 11, 1910.
2 SHEETS—SHEET 2.
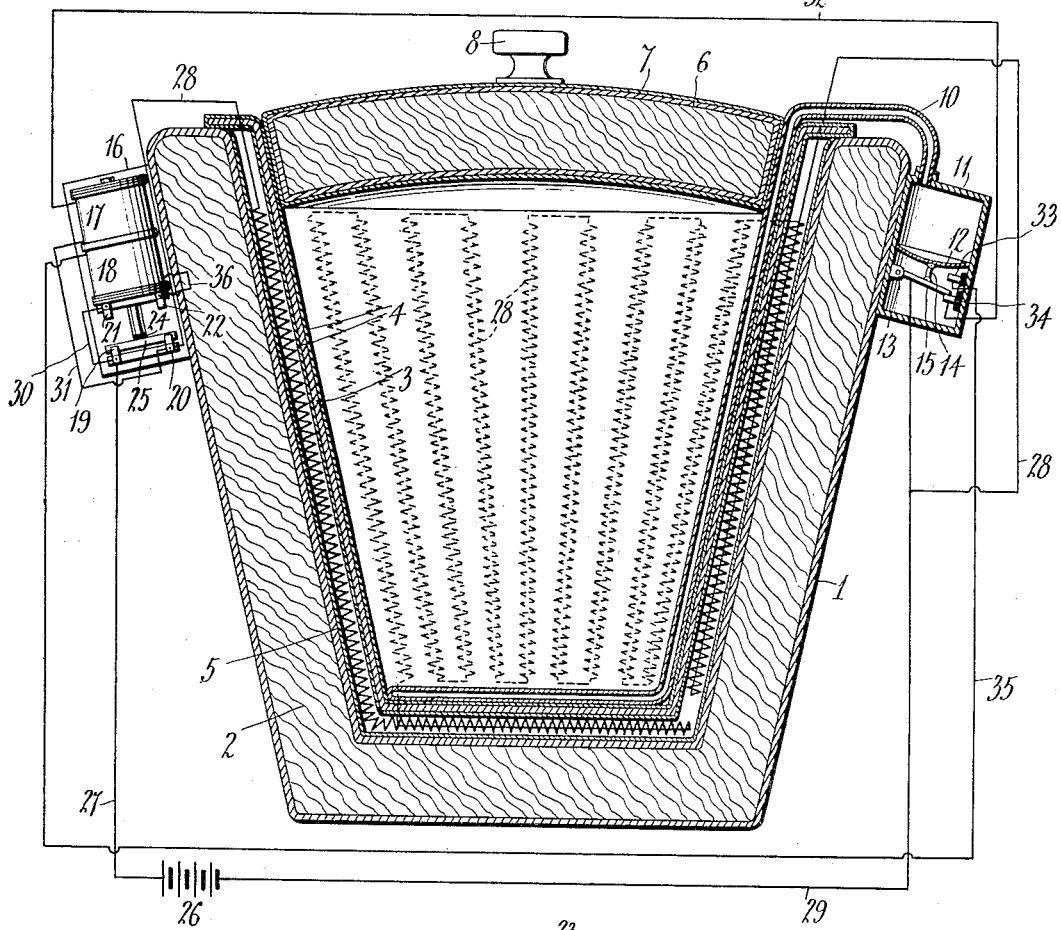
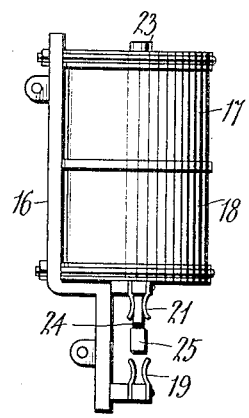
Witnesses
Inventor
Walter Richmond
By Chandler & Chandler
Attorneys

UNITED STATES PATENT OFFICE.

WALTER RICHMOND, OF MEMPHIS, TENNESSEE.

ELECTRIC HEATING-RECEPTACLE.

972,248.

Specification of Letters Patent. Patented Oct. 11, 1910.

Application filed February 13, 1909. Serial No. 477,549.

*To all whom it may concern:*

Be it known that I, WALTER RICHMOND, a citizen of the United States, residing at Memphis, in the county of Shelby, State of Tennessee, have invented certain new and useful Improvements in Electric Heating-Receptacles; and I do hereby declare the following to be a full, clear, and exact description of the invention, such as will enable others skilled in the art to which it appertains to make and use the same.

The invention relates to an electrically controlled heating receptacle and more particularly to the class of receptacles having a switch for controlling an electric current and a thermostat for regulating the temperature within the receptacle.

The primary object of the invention is the provision of a heating receptacle, a switch mechanism controlled by a circuit changing device and which in turn controls an electric circuit, a thermostat adapted to regulate the heat within the receptacle and alternately controlled by the electric circuit.

Another object of the invention is the provision of an electric heating receptacle adapted to receive material to be treated by heat, a thermostat adapted to regulate the heat within the receptacle and an electric switch controlled by a circuit changing device and which in turn controls an electric circuit and coöperative with the thermostat.

With the above and other objects in view the invention consists in general of a receptacle, a circuit changing device adapted to actuate a switch and which circuit changing device controls an electric circuit, and a thermostat arranged in the circuit for controlling the temperature within the receptacle.

The invention further consists in certain novel details of construction, combination and arrangement of parts hereinafter more fully described, illustrated in the accompanying drawings which disclose the preferred form of embodiment of the invention and as brought out in the appended claims.

In the drawings: Figure 1 is a side elevation of a heating receptacle in accordance with the invention. Fig. 2 is a longitudinal sectional view through the same, the thermostat, and the circuit changing device. Fig. 3 is a similar view with the thermostat in a changed position and also the circuit changing device. Fig. 4 is an enlarged detail sectional view of the circuit changing device.

Similar reference characters indicate corresponding parts throughout the several views in the drawings.

In the drawings the numeral 1 designates generally the outer receptacle the same being of hollow construction and having within it a heat insulating medium 2 and within the receptacle is disposed in spaced relation thereto an inner receiver or receptacle 3 which latter is provided with a porcelain enamel coating 4 and the inner surface of the receptacle 1 is provided with a porcelain enamel coating 5. In the mouth of the inner receptacle 3 is detachably fitted a cover or top 6 which latter is insulated as at 7 and is provided with a handle member 8 whereby the cover can be removed, raised or lowered as the occasion may demand.

Leading from the interior receiver or receptacle 3 is an air pipe 10 the same being in communication with a hollow tube or housing 11 in which latter is fitted a thermostatic disk 12 the same adapted to be expanded and contracted upon the raising and lowering of the temperature within the interior receiver or receptacle 3. Below said thermostatic disk 12 and projecting from the interior wall of the tube or housing 11 are spaced ears 13 supporting an arm 15 the same connected to the thermostatic disk 12 by a link 14 so that upon the expanding or contracting of the thermostatic disk the said arm will be moved alternately into engagement with electric contacts as will be hereinafter described.

Mounted upon a base 16 is a pair of solenoids 17 and 18 which latter are arranged in axial alinement and are securely fixed to the base by means of suitable clips. The end of the base adjacent the solenoids is elevated and on which elevated portion is mounted a pair of contact springs 19 and 20. Opposite the contact springs 19 and 20 is a similar pair of contact springs 21 and 22 which are arranged at the end of the solenoid 18.

Within the solenoids is held a core 23 provided with an extension 24 of suitable insulating material. Upon the extension 24 is mounted a contact bar 25 of conducting material such as copper or the like.

At 26 is shown an electric supply which is to be taken as typical of any suitable source of current and from the same leads a wire 27 which is connected to the contact springs 19. Connected to the contact springs 20 is a heating element such as a wire 28 the latter passing in a zig zag manner at the sides and the bottom between the enameled inner surface 5 and the inner enameled receptacle 3 and is in shunt connection with a return wire 29 which latter has one end connected to the arm 15 and its other end with the current supply 26. It is obvious that the heating element is located between the enameled inner surface 5 of the outer receptacle and the enameled inner receptacle 3 thus affording a direct and easy path for the heat generated to the inner receptacle to be heated and at the same time giving the wire 28 freedom for expansion and contraction which takes place by the alternating heating and cooling thereof.

Connected to the contact springs 19 and 21 is a bridge wire 30 and connected to the contact springs 20 and to the solenoid 17 is a wire 31. Leading from the solenoid 17 is a wire 32, the latter connected to a contact 34 arranged in the path of movement of the arm 15 within the tube or housing 11 and within which is arranged the thermostatic disk. A distance removed from the contact 34 and in the path of movement of the arm 15 within the tube or housing 11 is a contact 33 which latter has connected thereto a wire 35 the same connected to the solenoid 18. The solenoid 18 has connection with the contact fingers 22 by a wire 36.

In operation let it be presumed that the arm 15 has been raised by the expansion of the thermostatic disk 12 so as to bring said arm into engagement with the contact 33 and the bar 25 engaged with the contact springs 21 and 22. Current will flow from the source of supply 26 through the wire 27 to the bridge wire 30 through the same, bar 25, contact springs 22, through solenoid 18, wire 35 to contact 33 through arm 15, return wire 29 back to the source of supply 26. The result of this will be to energize the solenoid 18 and cause the bar 25 to be moved into contact with the contact springs 19 and 20. So long as the temperature remains low the current will flow through the wire 27, contact fingers 19, bar 25, contact fingers 20, wire 28 and return to the source of supply through the wire 29. If, however, the temperature increases beyond the desired point, the arm 15 will be caused to contact with the point 34. A portion of the current will now flow through the contact fingers 20 through the solenoid 17, wire 32, contact 34, arm 15 and wire 29 back to the source of current supply. This will energize the solenoid 17 and draw the bar 25 to the position first described, thereby breaking the circuit through the wire 28 by drawing the bar 25 from between the contact fingers 19 and 20. When the wire 28 has a current passing therethrough the same will cause the raising of the temperature within the receptacle 3 and should such temperature exceed a predetermined point it will cause the expansion of the thermostatic disk 12 to bring the arm into engagement with the contact 34 whereupon the current in the wire 28 will be shut off to permit the lowering of the temperature within the receptacle. The heating receptacle is controlled and regulated successively in the foregoing manner.

What is claimed is—

1. In an apparatus of the class described, an outer receptacle comprising spaced side and bottom walls and a connecting edge wall, said receptacle having heat insulating material packed in the space between the walls, an inner receptacle of heat conducting material provided with a flanged edge adapted to rest on the edge of the outer receptacle, said inner receptacle being spaced from the sides and bottom of the outer receptacle, an electric circuit including series connected heating coils arranged longitudinally of the space between the sides of said receptacles and transversely across the space between the bottoms thereof, and thermostatic means to open and close said circuit, including an expansion chamber covering the bottom of the inner receptacle, a pipe leading therefrom, and a pressure actuated switch connected to the pipe.

2. In an apparatus of the class described, an outer receptacle comprising spaced side and bottom walls and a connecting edge wall, said receptacle having heat insulating material packed in the space between the walls, an inner receptacle of heat conducting material provided with a flanged edge adapted to rest on the edge of the outer receptacle, said inner receptacle being spaced from the sides and bottom of the outer receptacle, an electric circuit including series connected heating coils arranged longitudinally of the space between the sides of said receptacles and transversely across the space between the bottoms thereof, and thermostatic means to open and close said circuit; said outer and inner receptacles being of inverted frusto-conical form, and the longitudinal coils having their axes in planes radial to the axes of the cones whereby the lower portion of the inner receptacle receives the major portion of the heat.

In testimony whereof, I affix my signature, in presence of two witnesses.

WALTER RICHMOND.

Witnesses:
C. JOHNSTON,
A. B. REESE.